Apr. 3, 1923.
R. E. L. JANNEY
1,450,293
TRANSITIONAL COUPLING ARRANGEMENT
Filed June 16, 1922
3 sheets-sheet 3
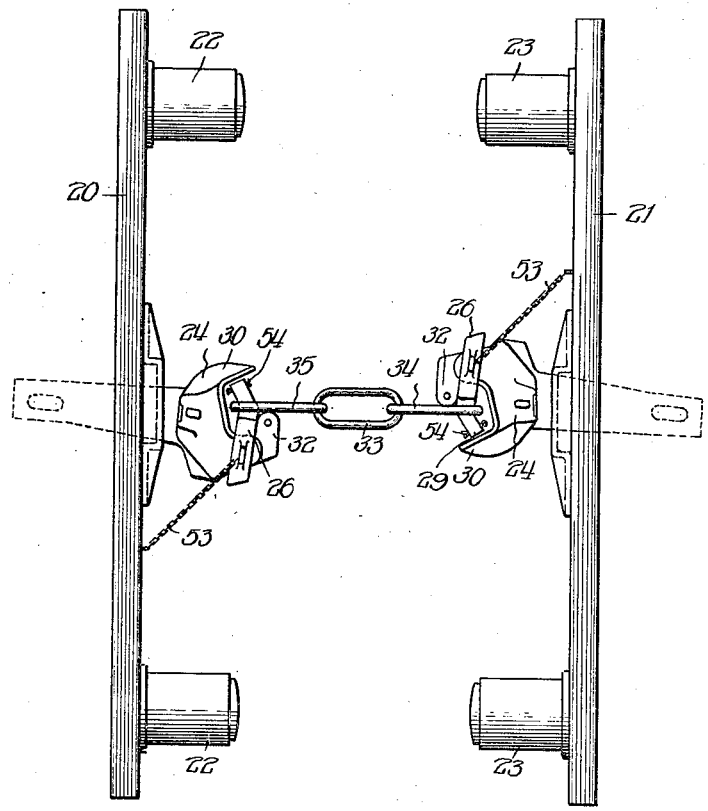
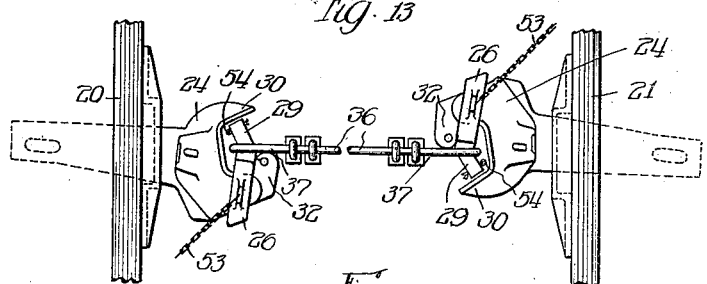
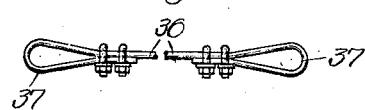

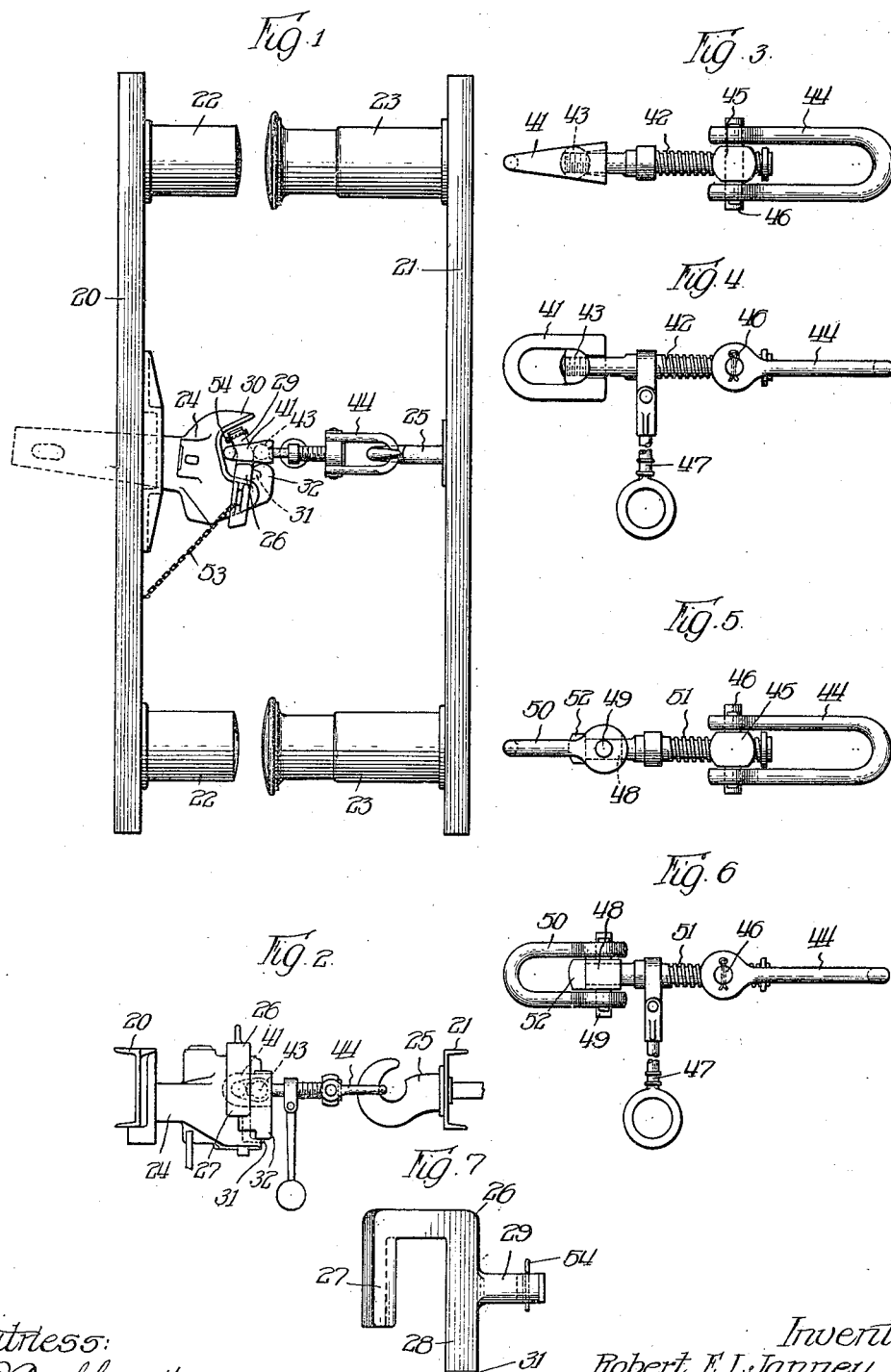

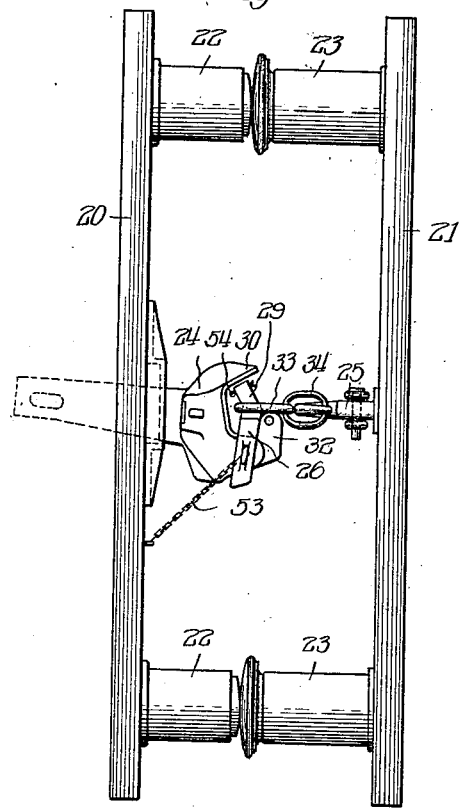
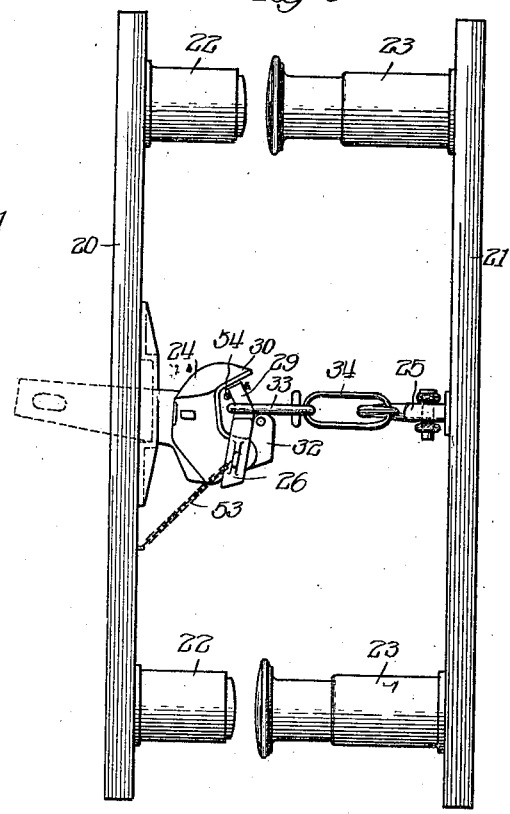
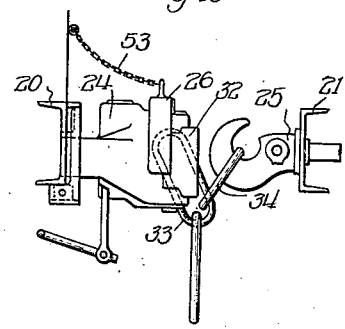
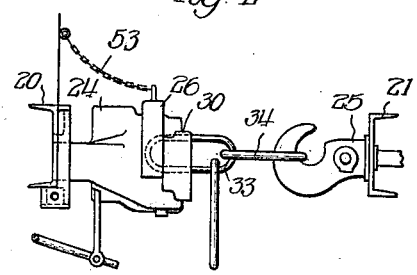
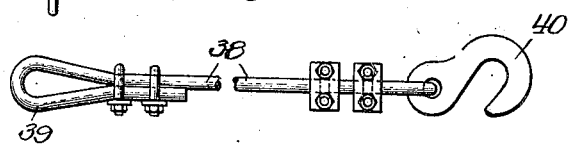

Patented Apr. 3, 1923.

1,450,293

UNITED STATES PATENT OFFICE.

ROBERT E. L. JANNEY, OF CHICAGO, ILLINOIS.

TRANSITIONAL COUPLING ARRANGEMENT.

Application filed June 16, 1922. Serial No. 568,809.

*To all whom it may concern:*

Be it known that I, ROBERT E. L. JANNEY, a citizen of the United States, residing at Chicago, in the county of Cook and State of Illinois, have invented certain new and useful Improvements in Transitional Coupling Arrangements, of which the following is a specification.

This invention relates to transitional coupler mechanism.

As is well known, in certain foreign countries railway cars are connected to each other by a hook and chain arrangement, adjacent ends of the cars being provided with cooperating bumpers to prevent damage to the car structures proper and to retain the cars a predetermined distance apart to prevent the connection from being disturbed. In some of these foreign countries, the railway companies are changing over from the hook and chain connection between cars to a connection made by automatic coupler. It will be appreciated that all of the cars cannot be equipped with automatic couplers at the same time, but nevertheless the cars which are equipped with automatic couplers and those which are not so equipped must be connected in the same train. In other words, there is a transitional period in which adjacent cars may be connected by the old hook and chain arrangement, or by an automatic coupler on one car and a hook on an adjacent car connected by a chain or similar element. During this transitional period obviously it is necessary to have buffers on the cars.

Accordingly, one object of my invention is to provide a transitional coupling arrangement whereby railway cars may be connected either by a coupler on one car and a hook on the other with an intermediate chain, cable, shackle mechanism or other suitable means, or if automatic couplers are applied to the adjacent cars with the buffers still in position, such couplers may be connected by similar intermediate means.

Another object is to provide a transitional coupling arrangement adapted to meet all the requirements for successful commercial operation.

These and other objects are accomplished by means of the arrangement disclosed on the accompanying sheets of drawings, in which—

Figure 1 is a fragmentary top plan view of a connection between adjacent ends of cars, an automatic coupler being applied to one car, a hook to the other, and shackle mechanism with a special yoke connecting such coupler and hook;

Figure 2 is a fragmentary side elevation of the same arrangement;

Figure 3 is an enlarged top plan view of the shackle connecting mechanism;

Figure 4 is a side elevation of the same;

Figure 5 is a top plan view of a modified form of shackle arrangement;

Figure 6 is a side elevation of the arrangement shown in Figure 5;

Figure 7 is a front elevation of a cast yoke used in connection with the automatic coupler;

Figure 8 is a top plan view of modified connecting means between an automatic coupler and a hook including a plurality of links and showing the buffers in engagement with each other;

Figure 9 is a similar view showing the links of the chain in tension and with the buffers out of engagement with each other;

Figure 10 is a side elevation of the arrangement shown in Figure 8;

Figure 11 is a side elevation of the arrangement shown in Figure 9;

Figure 12 is a top plan view of a transitional coupler mechanism in which automatic couplers are provided which are connected by three links when the buffers are in use;

Figure 13 is a view similar to that of Figure 12 with the exception that a cable is shown as the connecting means;

Figure 14 is a side elevation of the cable as shown in Figure 13; and

Figure 15 is a side elevation of a cable which may be used in the combination shown in various figures of the drawings for connecting a coupler and a hook or a plurality of couplers.

The various novel features of the invention will be apparent from the following description and drawings and will be particularly pointed out in the appended claims.

Referring first to all the general figures of the drawings, it will be noted that adjacent ends of adjacent cars are indicated by end sills 20 and 21 to which buffers 22 and 23 are respectively connected for engagement with each other to prevent damage to the car structures proper and to retain the cars a predetermined distance apart to prevent the connection from being disturbed.

Referring now more particularly to Figures 1 to 11 inclusive, it will be noted that one of the cars is provided with an automatic coupler 24 and the adjacent car provided with a hook 25, whereas in Figures 12 and 13 both cars are equipped with automatic couplers 24.

In all cases wherein the automatic coupler is used a yoke 26, as shown in Figure 7, is employed. This yoke preferably is a casting and includes a U-shaped portion having legs 27 and 28 which straddle the lugs of the coupler just back of the knuckle face, and has a horn 29 projecting toward and practically in engagement with the guard arm 30. This horn 29 is adapted to take or receive a coupling link or its equivalent which in turn may be connected to a coupler hook or to a similar horn on the associated coupler. The lower end of the inner leg 28 has a forwardly extending projection 31 which engages the lower part of the knuckle 32 to prevent the casting 26 working upwardly under draft. The yoke casting 26 is applied to and withdrawn from the coupler when the knuckle is in an open position and can only be applied by a downward movement and withdrawn by an upward movement. The yoke arrangement gives a certain amount of flexibility for uncoupling either on straight track or on a curve.

As shown in Figures 8, 9, 10 and 11, two links 33 and 34 are employed for making the connection between the yoke 26 and the hook 25 and in Figure 12 an additional link 35 is employed for connecting the yokes 26 which are connected to adjacent automatic couplers 24. It will be understood that with the arrangement shown in Figures 8 to 11 inclusive, it will be necessary to use the side buffers 22 and 23 to prevent damage to the old style hook by running into the face of the automatic coupler. To this end the stationary portion of the standard side buffer has been cut off to twelve and one-half (12½) inches or less and filling this center portion with a block of wood which will stand twelve and one-half (12½) inches from the end sill to be used as a temporary buffer during the transitional period. This will allow ample curvature. If it is desired to couple two automatic couplers on a short radius, such as might be experienced on industrial tracks, an auxiliary coupling is placed on each automatic coupler as above described in connection with Figure 12. Instead of using links as shown in Figures 8 to 12 inclusive, a cable 36 may be employed, such cable having looped ends 37 for receiving the horns 29 of the associated yokes 26. In Figure 15 is shown a cable 38 having one looped end 39 and a hook 40 to act as connecting means.

In Figures 1 to 6 inclusive another arrangement is shown as forming a connection between the U-shaped yoke member 26 and the hook 25 and includes a clevis 41 which is received by the horn 29. The clevis is joined to a screw coupling 42 by a ball and socket joint 43, as shown in Figures 1 to 4 inclusive, which ball and socket joint gives the necessary flexibility. The screw coupling is adjustably and operatively connected to a U-shaped connecting member 44 through a threaded member 45 mounted between the legs of the U-shaped member 44 and having trunnions 46 which are received within the legs of the member 44. It will be understood that the ball of the ball and socket joint also is threaded so that the coupling may be loosened or tightened by rotating the member 42 through the agency of a leverage member 47.

In Figures 5 and 6 there is substituted for the ball and socket joint a member 48 having trunnions 49 connected to a clevis 50, said member 48 having an opening through which the screw coupling member 51 may pass, said member 51 having a head 52 which engages the member 48 for limiting the movement of the screw coupling member 51 in one direction.

In the arrangement disclosed in Figures 1 to 6 inclusive, the knuckle may be opened and the link or U-shaped member 44 dropped over the hook coupler 25 and the knuckle then closed, there then being sufficient length to bring the side buffers into contact by means of the screw.

While the couplers are shown swung to one side of the center line, this is no more than the normal distance provided for side play of the coupler.

To prevent the U-shaped casting 26 from being lost it is preferably provided with a chain 53 which may be secured to the end sill of the car. The horn 29 of the yoke 26 is provided with a key 54 for preventing the clevis member 41 or link 35 from slipping off the horn 29 as the connection is being made.

By means of this transitional coupler mechanism an arrangement is provided which is adapted to meet the various requirements under service conditions.

It is my intention to cover all modifications of the invention falling within the spirit and scope of the following claims.

I claim :—

1. In combination, a plurality of railway cars the adjacent ends of which are provided with cooperating buffers, an automatic coupler connected to one end of one of said cars, a U-shaped member mounted over one portion of the coupler head and having a horn extending toward another portion of the coupler head, and means including a member for hooking around said horn whereby said coupler may be connected to a hook or automatic coupler on said other car regardless of the position of said buffers.

2. In transitional coupler mechanism, a coupler having a knuckle and a guard arm, and a U-shaped member fitting over the knuckle side of the coupler and having a horn extending toward the guard arm for receiving and maintaining a coupling connection.

3. In transitional coupler mechanism, a coupler having a knuckle and a guard arm, and a U-shaped member fitting over one portion of the coupler and having a horn extending toward the other portion of the coupler for receiving and maintaining a coupling connection.

4. In transitional coupler mechanism, a coupler head having oppositely arranged forwardly extending portions, a U-shaped member fitting over one of said portions and having a horn extending toward the other portion for receiving and maintaining a coupling connection.

5. In transitional coupler mechanism, a coupler having a knuckle and a guard arm, and a U-shaped member fitting over the knuckle side of the coupler and having a portion extending toward the guard arm for receiving and maintaining a coupling connection, said U-shaped member having means for normally preventing its withdrawal from said coupler.

6. In transitional coupler mechanism, a coupler having a knuckle and guard arm, and a U-shaped member fitting over the knuckle side of the coupler to the rear of the knuckle and having a horn extending toward the guard arm for receiving and maintaining a coupling connection.

7. In transitional coupler mechanism, a coupler having a knuckle and guard arm, and a U-shaped member fitting over the knuckle side of the coupler to the rear of the knuckle and having a horn extending toward the guard arm for receiving and maintaining a coupling connection, said member having a forwardly extending projection underlying the knuckle to prevent accidental withdrawal of said U-shaped member.

Signed at Chicago, Illinois, this 12th day of June, 1922.

ROBERT E. L. JANNEY.